(12) United States Patent
Mizutani et al.

(10) Patent No.: US 12,116,672 B2
(45) Date of Patent: *Oct. 15, 2024

(54) AL OR AL ALLOY-COATED STAINLESS STEEL SHEET AND METHOD OF MANUFACTURING FERRITIC STAINLESS STEEL SHEET

(71) Applicant: JFE STEEL CORPORATION, Tokyo (JP)

(72) Inventors: Akito Mizutani, Tokyo (JP); Mitsuyuki Fujisawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 441 days.

This patent is subject to a terminal disclaimer.

(21) Appl. No.: 17/596,389

(22) PCT Filed: Apr. 24, 2020

(86) PCT No.: PCT/JP2020/017794
§ 371 (c)(1),
(2) Date: Dec. 9, 2021

(87) PCT Pub. No.: WO2020/255563
PCT Pub. Date: Dec. 24, 2020

(65) Prior Publication Data
US 2022/0170144 A1 Jun. 2, 2022

(30) Foreign Application Priority Data
Jun. 19, 2019 (JP) .................. 2019-114026

(51) Int. Cl.
*C23C 2/12* (2006.01)
*C21D 8/02* (2006.01)
(Continued)

(52) U.S. Cl.
CPC .............. *C23C 2/12* (2013.01); *C21D 8/0205* (2013.01); *C21D 8/0226* (2013.01);
(Continued)

(58) Field of Classification Search
CPC ......... B32B 15/012; C23C 2/12; C23C 2/261; C22C 21/00; C22C 21/02; C22C 38/001;
(Continued)

(56) References Cited

U.S. PATENT DOCUMENTS 10,260,134 B2 * 4/2019 Hamada .................. C22C 38/32
2003/0086809 A1 5/2003 Cedergren et al.
(Continued)

FOREIGN PATENT DOCUMENTS

EP 0688882 A1 12/1995
EP 2177642 A1 4/2010
(Continued)

OTHER PUBLICATIONS

On-line translation of JP-3930643-B2, Jun. 2007. (Year: 2007).*
(Continued)

*Primary Examiner* — Jie Yang
(74) *Attorney, Agent, or Firm* — KENJA IP LAW PC

(57) ABSTRACT

Provided is an Al or Al alloy-coated stainless steel sheet having a coating substrate and a hot-dip Al or Al alloy coated layer provided on a surface of the coating substrate, the coating substrate having a predetermined chemical composition, the Mo content and W content of the chemical composition of the coating substrate, the thickness of the coating substrate, and the thickness of the hot-dip Al or Al alloy coated layer satisfying predetermined relations.

6 Claims, 1 Drawing Sheet

(51) Int. Cl.
  *C22C 38/00* (2006.01)
  *C22C 38/02* (2006.01)
  *C22C 38/04* (2006.01)
  *C22C 38/06* (2006.01)
  *C22C 38/44* (2006.01)
  *C22C 38/50* (2006.01)
  *C23C 2/26* (2006.01)
  *C23C 2/28* (2006.01)
  *C23C 2/40* (2006.01)

(52) U.S. Cl.
  CPC .......... *C21D 8/0236* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/44* (2013.01); *C22C 38/50* (2013.01); *C23C 2/261* (2022.08); *C23C 2/28* (2013.01); *C23C 2/29* (2022.08); *C23C 2/40* (2013.01); *C21D 2211/005* (2013.01)

(58) Field of Classification Search
  CPC ... C22C 38/002; C22C 38/004; C22C 38/005; C22C 38/02; C22C 38/04; C22C 38/06; C22C 38/42; C22C 38/44; C22C 38/46; C22C 38/48; C22C 38/50; C22C 38/52; C22C 38/54; C21D 1/26; C21D 8/0236; C21D 8/0278; C21D 8/0247; C21D 8/0273; C21D 9/46
  See application file for complete search history.

(56) References Cited

U.S. PATENT DOCUMENTS

| | | |
|---|---|---|
| 2008/0210348 A1 | 9/2008 | Goransson et al. |
| 2015/0217277 A1 | 8/2015 | Toru et al. |
| 2017/0275744 A1* | 9/2017 | Ta .......................... C22C 38/42 |

FOREIGN PATENT DOCUMENTS

| | | |
|---|---|---|
| EP | 3851550 A1 | 7/2021 |
| JP | H07233451 A | 9/1995 |
| JP | H111750 A | 1/1999 |
| JP | H11350084 A | 12/1999 |
| JP | 2005298912 A | 10/2005 |
| JP | 3930643 B2 * | 6/2007 |
| JP | 2007524001 A | 8/2007 |
| JP | 2013079428 A | 5/2013 |
| JP | 2016102231 A | 6/2016 |
| WO | 2020054384 A1 | 3/2020 |

OTHER PUBLICATIONS

Jul. 21, 2020, International Search Report issued in the International Patent Application No. PCT/JP2020/017794.

Oct. 24, 2022, the Extended European Search Report issued by the European Patent Office in the corresponding European Patent Application No. 20826596.7.

* cited by examiner

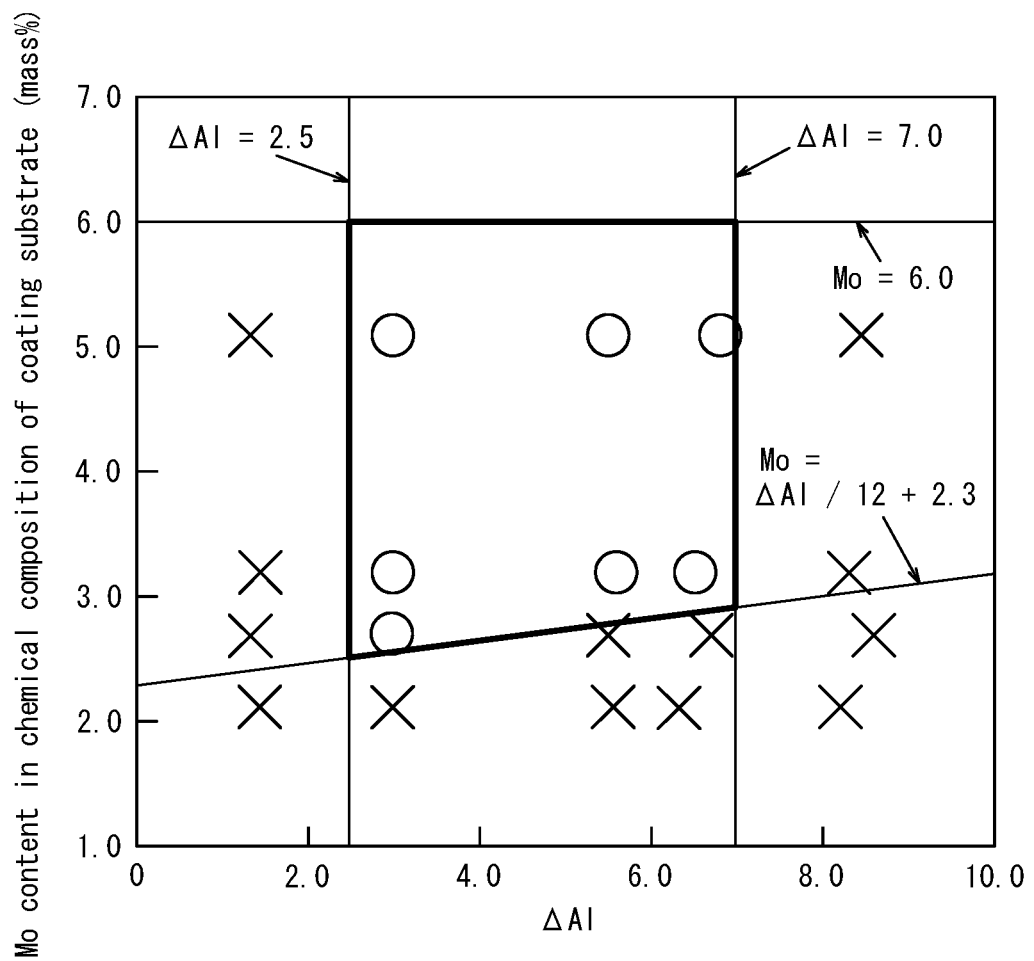

AL OR AL ALLOY-COATED STAINLESS STEEL SHEET AND METHOD OF MANUFACTURING FERRITIC STAINLESS STEEL SHEET

TECHNICAL FIELD

This disclosure relates to an Al or Al alloy-coated stainless steel sheet used as a base steel sheet for manufacturing a ferritic stainless steel sheet having excellent oxidation resistance and little deformation such as warpage or distortion even when the sheet thickness is thin.

This disclosure also relates to a method for manufacturing a ferritic stainless steel sheet having excellent oxidation resistance and little deformation such as warpage or distortion even when the sheet thickness is thin.

BACKGROUND

Ferritic stainless steel has excellent oxidation resistance at high temperatures. Therefore, ferritic stainless steel is processed, for example, into a steel sheet having a sheet thickness of about 20 µm or more and 200 µm or less, so-called foil material (hereinafter also referred to as "stainless steel foil") and used as a catalyst carrier (hereinafter also referred to as "metal honeycomb") in exhaust gas purification equipment for automobiles, motorcycles, marine bikes, motorboats, large lawn mowers, small generators, and the like.

The metal honeycomb has, for example, a honeycomb structure in which flat stainless steel foils (flat foils) and wave-shaped stainless steel foils (wave foils) are alternately stacked. The stainless steel foils are fixed to each other by, for example, brazing. In addition, a catalytic material is applied to the surfaces of the stainless steel foils.

The stainless steel foils used in the metal honeycomb are required to have excellent oxidation resistance at high temperatures and to maintain their shape even at high temperatures (shape change resistance). This is because when the stainless steel foils are deformed, a catalyst layer peels off and holes in the metal honeycomb collapse, making it difficult for exhaust gas to pass through.

In general, as the Al content in stainless steel increases, oxidation resistance and shape change resistance at high temperatures are improved. However, Al is an element that reduces the toughness of steel. Therefore, as the Al content increases, cracking and fracture are more likely to occur during hot and cold rolling.

Therefore, the following method has been proposed for manufacturing a stainless steel sheet (stainless steel foil) with high Al content.

In detail, a stainless steel sheet with low Al content is used as a coating or plating substrate, and on its surface, Al or Al alloy coating or plating is applied. Then, the resulting Al or Al alloy-coated or plated stainless steel sheet is subjected to heat treatment. In this way, Al contained in the Al or Al alloy coating or plating diffuses into the steel to produce a stainless steel sheet (stainless steel foil) with high Al content.

As the above Al or Al alloy-coated or plated stainless steel sheet, for example, JPH07-233451 A (PTL 1) discloses the following:

"an Al-coated or plated stainless steel sheet having excellent high temperature oxidation resistance obtained by coating or plating a ferritic stainless steel sheet with Al or Al alloy, the ferritic stainless steel sheet comprising, by weight, C: 0.05% or less, Si: 1.0% or less, Mn: 1.0% or less, Cr: 10% or more and 30% or less, N: 0.05% or less, Mo: 0.1% or more and 4.0% or less, a total of one or more elements selected from the group consisting of rare earth elements and Y: 0.01% or more and 0.2% or less, with the balance being Fe and inevitable impurities".

CITATION LIST

Patent Literature

PTL 1: JPH07-233451A

SUMMARY

Technical Problem

The method of applying Al or Al alloy coating or plating to a stainless steel sheet includes a hot-dip coating method and a vapor deposition method. However, the vapor deposition method generally has low production efficiency. Therefore, from the viewpoint of productivity, it is desirable to apply Al or Al alloy coating to a stainless steel sheet by hot-dip coating.

However, in the technique of PTL 1, when Al or Al alloy coating is applied to a stainless steel sheet used as a coating substrate by hot-dip coating, deformation such as warpage or distortion tends to occur during the heat treatment (hereinafter also referred to as diffusion heat treatment) in which Al contained in the Al or Al alloy coating diffuses into the stainless steel sheet. In particular, in the diffusion heat treatment, when the thickness of the stainless steel sheet used as a coating substrate is thin, for example, 200 µm or less, or when the amount of Al increased by the diffusion heat treatment is large, the deformation becomes remarkable.

In the steel sheet obtained after the diffusion heat treatment, the large amount of Al exists as solute Al and thus the strength is greatly increased. Therefore, when deformation such as warpage or distortion occurs in the steel sheet during the diffusion heat treatment, it is very difficult to correct the steel sheet to its original shape. Even when the diffusion heat treatment is performed after the Al or Al alloy-coated stainless steel sheet is processed into a predetermined part shape, deformation occurs during the diffusion heat treatment and the part shape is deformed.

It could thus be helpful to provide an Al or Al alloy-coated stainless steel sheet used as a base steel sheet for manufacturing a ferritic stainless steel sheet having excellent oxidation resistance and little deformation such as warpage or distortion even when the sheet thickness is thin.

It could also be helpful to provide a method for manufacturing a ferritic stainless steel sheet having excellent oxidation resistance and little deformation such as warpage or distortion even when the sheet thickness is thin.

Solution to Problem

We made various studies to achieve the objects. First, we tested and examined the cause of deformation such as warpage or distortion occurring when the Al or Al alloy-coated stainless steel sheet is subjected to the diffusion heat treatment.

As a result, we found that the deformation is caused by density change when Al diffuses into the stainless steel sheet used as a coating substrate (hereinafter referred to simply as coating substrate).

In detail, when Al diffuses and dissolves into the coating substrate, the density of the coating substrate decreases and the volume tends to increase. In the process of the diffusion heat treatment, the Al content in the surface layer of the coating substrate becomes higher than that in the center part thereof, and thus the density differs in the thickness direction of the coating substrate. In addition, when the Al coating weight on a surface of the coating substrate becomes non-uniform, the density differs even in the in-plane direction of the surface of the coating substrate. As a result, stress occurs inside the steel sheet. The stainless steel sheet, especially ferritic stainless steel sheet, has low strength at high temperatures, so the steel sheet cannot withstand the stress and thus deformation such as warpage or distortion occurs.

In particular, when Al or Al alloy coating is performed by hot-dip coating, the Al coating weight on the surface of the coating substrate tends to be non-uniform. Therefore, the density in the in-plane direction of the surface of the coating substrate remarkably differs. Further, when the thickness of the coating substrate is thin, deformation occurs with a smaller load than when the sheet thickness is thick. Furthermore, when the amount of Al increased by the diffusion heat treatment is large, the volume change during diffusion becomes larger. Therefore, the density in the thickness direction of the coating substrate more remarkably differs. For the above reasons, when a thin stainless steel sheet applied with Al or Al alloy coating by hot-dip coating is subjected to the diffusion heat treatment, the deformation becomes more pronounced.

Based on the above findings, we conducted further investigation to suppress deformation such as warpage or distortion that occurs during the diffusion heat treatment.

As a result, we made the following discoveries.

In detail, it is effective to optimize the thickness of the coating substrate and the thickness of the hot-dip Al or Al alloy coated layer formed on the surface of the coating substrate, and according to these thicknesses, add at least one of Mo or W to the chemical composition of the coating substrate in an appropriate amount, and at the same time, to add at least one of Zr, Hf, or REM to the chemical composition of the coating substrate in an appropriate amount. This prevents occurrence of deformation such as warpage and distortion during the diffusion heat treatment.

We consider the reason for this to be as follows.

(1) The amount of Al increased by the diffusion heat treatment depends on the ratio of the thickness of the hot-dip Al or Al alloy coated layer formed on the surface of the coating substrate to the thickness of the coating substrate (hereinafter also referred to as thickness ratio).

(2) Mo and W are elements that increase strength at high temperatures. Therefore, by setting the amount of Al increased by the diffusion heat treatment, in other words, the thickness ratio to a certain range, and adjusting the Mo and W contents of the chemical composition of the coating substrate according to the thickness ratio, the strength of the coating substrate at high temperatures can be increased to suppress deformation during the diffusion heat treatment.

(3) In addition, when hot-dip coating is performed, the coating substrate is immersed in molten Al or Al alloy.

(4) Therefore, prior to the immersion of the coating substrate, it is necessary to raise the sheet temperature of the coating substrate to about 650° C. to 750° C., which is about the same as the temperature of the molten Al or Al alloy.

(5) In this process, Cr in the coating substrate may be oxidized to form a $Cr_2O_3$ layer on the surface of the coating substrate. When such a $Cr_2O_3$ layer is formed on the surface of the coating substrate, the coatability of the Al or Al alloy coating is reduced during the coating treatment. Therefore, the Al coating weight on the surface of the coating substrate tends to be non-uniform.

(6) In this respect, by containing an appropriate amount of at least one of Zr, Hf or REM to the chemical composition of the coating substrate, in particular, by containing Zr and/or Hf and REM in combination to the chemical composition of the coating substrate, the formation of the $Cr_2O_3$ layer is effectively suppressed to improve the coatability of the Al or Al alloy coating. As a result, the non-uniformity of the Al coating weight on the surface of the coating substrate is suppressed.

(7) Due to the aforementioned synergistic effect, even when a thin stainless steel sheet applied with Al or Al alloy coating by hot-dip coating is subjected to the diffusion heat treatment, the amount of Al in the steel can be significantly (specifically, by 2.5 mass % or more) increased, or in other words, the oxidation resistance can be significantly increased while deformation such as warpage and distortion is effectively suppressed.

This disclosure is based on these discoveries and further studies.

Primary features of this disclosure are as follows.

1. An Al or Al alloy-coated stainless steel sheet comprising a coating substrate and a hot-dip Al or Al alloy coated layer on a surface of the coating substrate, wherein the coating substrate is a ferritic stainless steel sheet having a chemical composition containing (consisting of), in mass %, C: 0.030% or less,
Si: 1.50% or less,
Mn: 1.00% or less,
P: 0.040% or less,
S: 0.010% or less,
Cr: 11.0% or more and 30.0% or less,
Al: 1.00% or less,
Ni: 0.05% or more and 0.50% or less,
N: 0.030% or less,
at least one selected from the group consisting of
Mo: 2.5% or more and 6.0% or less and
W: 2.5% or more and 6.0% or less,
and at least one selected from the group consisting of
Zr: 0.01% or more and 0.20% or less,
Hf: 0.01% or more and 0.20% or less and
REM: 0.01% or more and 0.20% or less,
with the balance being Fe and inevitable impurities, and Mo and W contents in the chemical composition of the coating substrate and ΔAl satisfy the following formulas (1) and (2):

$$2.5 \leq \Delta Al \leq 7.0 \tag{1}$$

$$Mo + W - (\Delta Al/12 + 2.3) \geq 0 \tag{2}$$

where $$\Delta Al = 30 \times t/T \tag{3}$$

and in the above formulas (1) to (3),
Mo is the Mo content in the chemical composition of the coating substrate (mass %),
W is the W content in the chemical composition of the coating substrate (mass %),
T is the thickness of the coating substrate (μm), and
t is the thickness of the hot-dip Al or Al alloy coated layer, and, in the case where the hot-dip Al or Al alloy coated layer is present on each of both sides of the coating substrate, is the total thickness of the hot-dip Al or Al alloy coated layers on both sides of the coating substrate (μm).

2. The Al or Al alloy-coated stainless steel sheet according to 1., wherein the chemical composition of the coating substrate further containing, in mass %, at least one selected from the group consisting of
Cu: 0.01% or more and 0.10% or less,
Ti: 0.01% or more and 0.50% or less,
Nb: 0.01% or more and 0.50% or less,
V: 0.01% or more and 0.50% or less,
B: 0.0001% or more and 0.0050% or less,
Ca: 0.0002% or more and 0.0100% or less,
Mg: 0.0002% or more and 0.0100% or less, and
Co: 0.01% or more and 0.50% or less.

3. A method for manufacturing a ferritic stainless steel sheet, comprising subjecting the Al or Al alloy-coated stainless steel sheet according to 1. or 2. to heat treatment in which the Al or Al alloy-coated stainless steel sheet is held at a temperature range of 600° C. to 1300° C. for at least one minute.

4. A method for manufacturing a ferritic stainless steel sheet, comprising subjecting the Al or Al alloy-coated stainless steel sheet according to 1. or 2. to cold rolling followed by heat treatment in which the Al or Al alloy-coated stainless steel sheet is held at a temperature range of 600° C. to 1300° C. for at least one minute.

Advantageous Effect

According to this disclosure, it is possible to obtain an Al or Al alloy-coated stainless steel sheet used as a base steel sheet for manufacturing a ferritic stainless steel sheet having excellent oxidation resistance and little deformation such as warpage or distortion even when the sheet thickness is thin. In addition, since the Al or Al alloy-coated stainless steel sheet of this disclosure can be manufactured by hot-dip coating, it is very advantageous in terms of productivity.

Further, the ferritic stainless steel sheet manufactured from the Al or Al alloy-coated stainless steel sheet of this disclosure is particularly excellent in oxidation resistance at high temperatures, and thus can be suitably used for catalyst carriers of automobiles or motorcycles, outer casing materials of such catalyst carriers, muffler piping members of automobiles or motorcycles, exhaust duct members of heating appliances or combustion apparatuses, and the like. In addition, the ferritic stainless steel sheet manufactured from the Al or Al alloy-coated stainless steel sheet of this disclosure can be suitably used as a catalyst carrier for exhaust gas purification equipment for agricultural machinery such as tractors and combine harvesters and construction machinery such as bulldozers and excavators, as well as a catalyst carrier for factory exhaust gas purification equipment.

BRIEF DESCRIPTION OF THE DRAWINGS

In the accompanying drawing:
FIG. 1 illustrates the effect of ΔAl and the Mo content in the chemical composition of a coating substrate on deformation during diffusion heat treatment and oxidation resistance.

DETAILED DESCRIPTION

This disclosure will be described below based on the following embodiments.

The Al or Al alloy-coated stainless steel sheet according to one of the disclosed embodiments has a coating substrate which is a ferritic stainless steel sheet having a predetermined chemical composition (hereinafter simply referred to as coating substrate), and a hot-dip Al or Al alloy coated layer on the surface of the coating substrate.

First, the chemical composition of the coating substrate will be described. The unit "%" in the chemical composition refers to "mass %" unless specified otherwise.

C: 0.030% or Less
When the C content exceeds 0.030%, the toughness of the steel sheet degrades, which makes it difficult to manufacture the coating substrate. Therefore, the C content is set to 0.030% or less. The C content is preferably 0.020% or less, and more preferably 0.010% or less. No lower limit is particularly placed on the C content, yet the C content is preferably set to 0.001% or more.

Si: 1.50% or Less
Si has an effect of increasing the oxidation resistance of the steel. From the viewpoint of obtaining such an effect, the Si content is preferably set to 0.01% or more. The Si content is more preferably 0.10% or more. However, a Si content exceeding 1.50% excessively hardens the steel, which makes it difficult to process the steel sheet into a predetermined part shape. Therefore, the Si content is set to 1.50% or less. The Si content is preferably 1.00% or less, and more preferably 0.30% or less.

Mn: 1.00% or Less
A Mn content exceeding 1.00% deteriorates the oxidation resistance of the steel. Therefore, the Mn content is set to 1.00% or less. The Mn content is preferably 0.50% or less, and more preferably 0.15% or less. However, when a Mn content of less than 0.01% is attained, refining becomes difficult. Therefore, the Mn content is preferably 0.01% or more.

P: 0.040% or Less
A P content exceeding 0.040% deteriorates the toughness and ductility of the steel, which makes it difficult to manufacture the coating substrate. Therefore, the P content is set to 0.040% or less. The P content is preferably 0.030% or less. No lower limit is particularly placed on the P content, yet excessive dephosphorization leads to cost increase. Therefore, the P content is preferably set to 0.005% or more.

S: 0.010% or Less
A S content exceeding 0.010% reduces hot workability, which makes it difficult to manufacture the coating substrate. Therefore, the S content is set to 0.010% or less. The S content is preferably 0.004% or less, and more preferably 0.002% or less. No lower limit is particularly placed on the S content, yet excessive desulfurization leads to cost increase. Therefore, the S content is preferably set to 0.0005% or more.

Cr: 11.0% or more and 30.0% or Less
Cr is a necessary element to ensure oxidation resistance at high temperatures. When the Cr content is less than 11.0%, oxidation resistance at high temperatures cannot be sufficiently ensured. On the other hand, a Cr content exceeding 30.0% reduces the toughness of a slab and a hot-rolled steel sheet during manufacturing process, which makes it difficult to manufacture the coating substrate. Therefore, the Cr content is set to 11.0% or more and 30.0% or less. The Cr content is preferably 15.0% or more, more preferably 18.0% or more, and further preferably 20.5% or more. The Cr content is preferably 26.0% or less, more preferably 22.0% or less, and further preferably 21.5% or less.

Al: 1.00% or Less

Al has an effect of producing an oxide layer whose main component is $Al_2O_3$ at high temperatures to improve oxidation resistance. However, Al reduces the toughness of the steel. Therefore, when the Al content exceeds 1.00%, cracking or fracture tends to occur in a descaling process or rolling process of a hot-rolled steel sheet or cold-rolled steel sheet, which makes it difficult to manufacture the coating substrate. Therefore, the Al content is set to 1.00% or less. The Al content is preferably 0.50% or less, and more preferably less than 0.10%. No lower limit is particularly placed on the Al content, yet the Al content is preferably set to 0.001% or more.

Ni: 0.05% or more and 0.50% or Less

Ni has an effect of improving brazing property in manufacturing a metal honeycomb. From the viewpoint of achieving such an effect, the Ni content is set to 0.05% or more. On the other hand, Ni is an element that stabilizes austenite microstructure. Therefore, when the Ni content is high, especially when it exceeds 0.50%, an austenite microstructure tends to be formed when the steel is used as a metal honeycomb. In detail, when Al in the steel is depleted due to the progress of oxidation at high temperatures during used as a metal honeycomb, an austenite microstructure is easily formed. The formation of austenite microstructure may change the thermal expansion coefficient of the part, resulting in failure such as fracture of the part. Therefore, the Ni content is set to 0.50% or less. The Ni content is preferably 0.20% or less.

N: 0.030% or Less

A N content exceeding 0.030% reduces toughness, which makes it difficult to manufacture the coating substrate. Therefore, the N content is set to 0.030% or less. The N content is preferably 0.020% or less, and more preferably 0.010% or less. No lower limit is particularly placed on the N content, yet excessive denitrification leads to cost increase. Therefore, the N content is preferably set to 0.001% or more.

At Least One of Mo: 2.5% or More and 6.0% or Less and W: 2.5% or More and 6.0% or Less Mo and W have an effect of increasing strength at high temperatures and suppressing deformation during diffusion heat treatment. This effect is obtained with a Mo content and/or a W content of 2.5% or more. On the other hand, a Mo content and W content exceeding 6.0% reduces workability. Therefore, the Mo content and W content are each set to 2.5% or more and 6.0% or less. Each of the Mo content and W content is preferably 5.0% or less.

When Mo and W are contained at the same time, the total content of Mo and W is preferably set to 6.0% or less from the viewpoint of preventing a decrease in workability.

At Least One from Zr: 0.01% or More and 0.20% or Less, Hf: 0.01% or More and 0.20% or Less, and REM: 0.01% or More and 0.20% or Less Zr, Hf and REM have an effect of improving the coatability of the Al or Al alloy coating (hereinafter also referred to simply as coatability). As described above, when Al or Al alloy coating is applied, the coating substrate is immersed in molten Al or Al alloy. Therefore, it is necessary to raise the sheet temperature of the coating substrate to about 650° C. to 750° C., which is about the same as the temperature of the molten Al or Al alloy, before the immersion of the coating substrate. However, if a $Cr_2O_3$ layer is formed on the surface of the coating substrate during the temperature raising, the coatability of the coating degrades. In this regard, Zr, Hf and REM are effective in reducing the growth rate of the $Cr_2O_3$ layer during the temperature raising to improve the coatability of the coating. From the viewpoint of achieving such an effect, the Zr content, Hf content and REM content are each set to 0.01% or more. However, when the Zr content, Hf content and REM content exceed 0.20%, the hot workability decreases to make it difficult to manufacture the coating substrate. Therefore, the contents of Zr, Hf and REM are each set to 0.01% or more and 0.20% or less. Each of the contents of Zr, Hf and REM is preferably 0.02% or more. Each of the contents of Zr and Hf is preferably 0.10% or less, and more preferably 0.05% or less. The REM content is preferably 0.15% or less, and more preferably 0.10% or less.

Although any one of Zr, Hf, and REM may be contained, or two or more of them may be contained in combination, from the viewpoint of improving the coatability of the coating, it is particularly advantageous to add Zr and/or Hf and REM in combination. In the case where two or more of Zr, Hf and REM are contained, the total content of Zr, Hf and REM is preferably set to 0.20% or less.

Here, REM refers to Sc, Y and lanthanide elements (elements with atomic numbers from 57 to 71 such as La, Ce, Pr, Nd, and Sm). As REM, one of Sc, Y and the lanthanide elements may be contained, or two or more of them may be contained together.

Although the basic components have been described above, in addition to the basic components, at least one selected from the group consisting of Cu: 0.01% or more and 0.10% or less, Ti: 0.01% or more and 0.50% or less, Nb: 0.01% or more and 0.50% or less, V: 0.01% or more and 0.50% or less, B: 0.0001% or more and 0.0050% or less, Ca: 0.0002% or more and 0.0100% or less, Mg: 0.0002% or more and 0.0100% or less, and Co: 0.01% or more and 0.50% or less can be appropriately contained.

Cu: 0.01% or More and 0.10% or Less

Cu has an effect of improving high temperature strength by precipitating in the steel. This effect can be obtained when the Cu content is 0.01% or more. However, a Cu content exceeding 0.10% deteriorates the toughness of the steel. Therefore, when Cu is contained, the Cu content is set to 0.01% or more and 0.10% or less. The Cu content is more preferably 0.05% or less.

Ti: 0.01% or More and 0.50% or Less

Ti has effects of improving toughness and oxidation resistance by combining with C and N in the steel. Such effects can be obtained when the Ti content is 0.01% or more. However, if the Ti content exceeds 0.50%, a large amount of Ti oxides is mixed into an $Al_2O_3$ layer formed at high temperatures when the steel sheet is used as a metal honeycomb. This results in a decrease in oxidation resistance at high temperatures. Therefore, when Ti is contained, the Ti content is set to 0.01% or more and 0.50% or less. The Ti content is more preferably 0.05% or more. The Ti content is more preferably 0.25% or less.

Nb: 0.01% or More and 0.50% or Less

Nb has an effect of improving toughness by combining with C and N in the steel. This effect is obtained when the Nb content is 0.01% or more. However, if the Nb content exceeds 0.50%, a large amount of Nb oxides is mixed into an $Al_2O_3$ layer formed at high temperatures when the steel sheet is used as a metal honeycomb. This results in a decrease in oxidation resistance at high temperatures. Therefore, when Nb is contained, the Nb content is set to 0.01% or more and 0.50% or less. The Nb content is more preferably 0.05% or more. The Nb content is more preferably 0.35% or less.

V: 0.01% or More and 0.50% or Less

V has an effect of improving toughness by combining with C and N in the steel. This effect is obtained when the V content is 0.01% or more. However, if the V content exceeds 0.50%, a large amount of V oxides is mixed into an $Al_2O_3$ layer formed at high temperatures when the steel sheet is used as a metal honeycomb. This results in a decrease in oxidation resistance at high temperatures. Therefore, when V is contained, the V content is set to 0.01% or more and 0.50% or less. The V content is more preferably 0.05% or more. The V content is more preferably 0.15% or less.

B: 0.0001% or More and 0.0050% or Less

B has an effect of strengthening the grain boundaries of the steel and preventing cracking during hot rolling in the manufacturing process of the coating substrate. This effect is obtained when the B content is 0.0001% or more. On the other hand, a B content exceeding 0.0050% leads to a reduction in oxidation resistance. Therefore, when B is contained, the B content is set to 0.0001% or more and 0.0050% or less. The B content is more preferably 0.0010% or more. The B content is more preferably 0.0015% or less.

Ca: 0.0002% or More and 0.0100% or Less, Mg: 0.0002% or More and 0.0100% or Less An appropriate amount of Ca or Mg has an effect of improving oxidation resistance by improving the coatability of an $Al_2O_3$ layer formed when the steel sheet is used as a metal honeycomb to the steel and reducing its growth rate. This effect can be obtained when the Ca content is 0.0002% or more and the Mg content is 0.0002% or more. More preferably, the Ca content is 0.0005% or more and the Mg content is 0.0015% or more. Further preferably, the Ca content is 0.0010% or more. However, when these elements are excessively contained, toughness and oxidation resistance may be deteriorated. Therefore, when Ca and Mg are contained, the Ca content and Mg content is each set to 0.0100% or less. More preferably, each of the Ca content and Mg content is 0.0050% or less.

Co: 0.01% or More and 0.50% or Less

Co has an effect of reducing the thermal expansion coefficient of the steel to suppress deformation during the diffusion heat treatment. This effect is obtained when the Co content is 0.01% or more. However, a Co content exceeding 0.50% increases the strength of the steel to deteriorate the manufacturability of foil materials. Therefore, when Co is contained, the Co content is set to 0.01% or more and 0.50% or less. The Co content is more preferably 0.05% or more. The Co content is more preferably 0.15% or less.

The components other than those described above are Fe and inevitable impurities.

The thickness of the coating substrate of the Al or Al alloy-coated stainless steel sheet according to one of the disclosed embodiments is not particularly limited, but when the thickness is larger, the coated layer must be thicker, which deteriorates productivity during the coating treatment. Therefore, the thickness of the coating substrate is preferably 1.0 mm or less. Further, the lower limit is preferably set to 30 µm in order to secure strength during coating treatment.

In particular, when the additional rolling process described below is performed after the hot-dip Al or Al alloy coating, the preferable thickness of the coating substrate of the Al or Al alloy-coated stainless steel sheet according to one of the disclosed embodiments is 0.1 mm or more and 1.0 mm or less. If the thickness of the coating substrate exceeds 1.0 mm, the productivity during the coating treatment decreases because it is necessary to make the coated layer thicker in order to obtain a necessary Al content after diffusion heat treatment. On the other hand, when the thickness of the coating substrate is less than 0.1 mm, a steel strip to be subjected to the coating treatment becomes longer and the productivity during the coating treatment is lower. Therefore, when an additional rolling process is performed after the hot-dip Al or Al alloy coating, the preferable thickness of the coating substrate of the Al or Al alloy-coated stainless steel sheet according to one of the disclosed embodiments is 0.1 mm or more and 1.0 mm or less. The more preferable sheet thickness is 0.2 mm or more. The more preferable sheet thickness is 0.5 mm or less.

In the absence of the additional rolling process as described below, the preferable thickness of the coating substrate of the Al or Al alloy-coated stainless steel sheet according to one of the disclosed embodiments is 20 µm or more and 200 µm or less. The thickness of the coating substrate is more preferably 150 µm or less, and further preferably 100 µm or less. Further, the thickness of the coating substrate is more preferably 30 µm or more.

Next, the hot-dip Al or Al alloy coated layer provided on the surface of the coating substrate of the Al or Al alloy-coated stainless steel sheet according to one of the disclosed embodiments is described.

The hot-dip Al or Al alloy coated layer is a coated layer formed by hot-dip Al coating or hot-dip Al—Si alloy coating.

Here, the chemical composition of the hot-dip Al coating (molten bath) is Al and inevitable impurities. The chemical composition of the hot-dip Al—Si alloy coating (molten bath) is Al, Si of 15.0 mass % or less, and inevitable impurities.

Si contained in the hot-dip Al—Si alloy coating (molten bath) has an effect of suppressing the formation of a Fe—Al-based intermetallic compound phase at the interface between the hot-dip Al or Al alloy coated layer and the coating substrate during the coating treatment and improving the exfoliation resistance and workability of the hot-dip Al or Al alloy coated layer. However, if the Si content of the hot-dip Al or Al alloy coated layer exceeds 15.0 mass %, columnar Si may precipitate in the Al or Al alloy coated layer, resulting in a decrease in exfoliation resistance and workability. Therefore, the Si content of the hot-dip Al—Si alloy coating (molten bath) is preferably set to 15.0 mass % or less. No lower limit is particularly placed on the Si content of the hot-dip Al—Si alloy coating (molten bath), yet the lower limit is preferably set to 1.0 mass %.

The inevitable impurities in the hot-dip Al coating (molten bath) and hot-dip Al—Si alloy coating (molten bath) include, for example, B, Be, Mg, Ca, Sr, Ti, Mn, Co, Ni, Cu, Zn, Sn, Pb, As, Sb, Bi, La, and Ce, and a total amount of 1 mass % or less is acceptable.

The chemical composition of the hot-dip Al or Al alloy coated layer formed on the surface of the coating substrate is not necessarily the same as the chemical compositions of the hot-dip Al coating (molten bath) and hot-dip Al—Si alloy coating (molten bath).

In detail, coated-substrate components which are incorporated into the molten bath through the reaction between the molten bath and the coating substrate during the coating treatment and the inevitable impurities in the molten bath are incorporated into the hot-dip Al or Al alloy coated layer. The coated-substrate components that are incorporated into the hot-dip Al or Al alloy coated layer include, for example, Fe and Cr. In the case of hot-dip Al—Si alloy coating (molten bath), Si is also incorporated into the hot-dip Al or Al alloy coated layer.

For example, in one of the disclosed embodiments, in the case where the coating substrate is used to form the hot-dip Al or Al alloy coated layer in the hot-dip Al coating (molten bath) or hot-dip Al—Si alloy coating (molten bath) by the coating method described below, the hot-dip Al or Al alloy coated layer consists of 80 mass % or more Al and 20 mass % or less in total the balance (e.g., Si, Fe, Cr and/or inevitable impurities). The total amount of the inevitable impurities (components other than Al, Si, Fe and Cr) contained in the Al or Al alloy coated layer is preferably 1 mass % or less.

In the Al or Al alloy-coated stainless steel sheet according to one of the disclosed embodiments, it is important to satisfy the following formulas (1) and (2):

$$2.5 \leq \Delta Al \leq 7.0 \quad (1)$$

$$Mo+W-(\Delta Al/12+2.3) \geq 0 \quad (2)$$

where $$\Delta Al = 30 \times t/T \quad (3)$$

and in the above formulas (1) to (3),
Mo is the Mo content in the chemical composition of the coating substrate (mass %),
W is the W content in the chemical composition of the coating substrate (mass %),
T is the thickness of the coating substrate (μm), and
t is the thickness of the hot-dip Al or Al alloy coated layer, and, in the case where the hot-dip Al or Al alloy coated layer is present on each of both sides of the coating substrate, is the total thickness of the hot-dip Al or Al alloy coated layers on both sides of the coating substrate) (μm).

In detail, we prepared Al or Al alloy-coated stainless steel sheets that vary in the thicknesses and Al content of the coating substrate and vary in the thickness of the hot-dip Al or Al alloy coated layer using various hot-dip Al coatings or hot-dip Al—Si alloy coatings, and examined the amount of Al increased by the diffusion heat treatment. We consequently found out that the amount of Al increased by the diffusion heat treatment can be predicted by $30 \times t/T$, using the thickness of the coating substrate and the thickness of the hot-dip Al or Al alloy coated layer.

Based thereon, we further investigated and found that when the amount of Al increased by the diffusion heat treatment, in other words, ΔAl is adjusted within the range of 2.5 to 7.0 (preferably within the range of 3.0 to 6.5, more preferably within the range of 4.0 to 6.0), deformation occurring during the diffusion heat treatment can be effectively suppressed by adjusting the Mo and W contents as the chemical composition of the coating substrate according to ΔAl, specifically by satisfying the above formula (2).

The following describes the experiments leading to the above findings.

Experiment

Slabs having the chemical compositions listed in Table 1 (with the balance being Fe and inevitable impurities) that were prepared by steelmaking in a 50 kg small vacuum melting furnace were heated to 1200° C. and then hot rolled in a temperature range of 900° C. to 1200° C. to obtain hot rolled steel sheets having a sheet thickness of 2.0 mm. Then, the obtained hot-rolled steel sheets were subjected to hot-rolled sheet annealing at 900° C. for 1 minute in air. Then, the surface scales of the hot-rolled steel sheets were removed by a pickling treatment in which the hot-rolled steel sheets were immersed in a 20 mass % sulfuric acid solution at a temperature of 80° C. for 60 seconds and then immersed in a 15 mass % nitric acid-3 mass % hydrofluoric acid mixed solution at a temperature of 55° C. for 30 seconds. Then, the hot-rolled steel sheets were cold rolled to produce cold-rolled steel sheets (ferritic stainless steel sheets) with the sheet thicknesses T listed in Table 2.

Using the cold-rolled steel sheets thus obtained as coating substrates, the coating treatment was performed by hot-dip coating in the same manner as in the EXAMPLES section below to obtain Al or Al alloy-coated stainless steel sheets.

Then, the thickness t of the hot-dip Al or Al alloy coated layer was measured in the same manner as in the EXAMPLES section below.

Then, after the Al or Al alloy-coated stainless steel sheets were subjected to additional cold rolling followed by the diffusion heat treatment to obtain ferritic stainless steel sheets as finished products. The heat treatment was performed by holding the steel sheets in a vacuum of $1 \times 10^{-1}$ Pa or less at 1100° C. for 30 minutes and subjecting them to furnace cooling.

Then, in the same manner as in the EXAMPLES section below, (1) deformation during heat treatment and (2) oxidation resistance were evaluated, and the evaluation results are plotted in FIG. 1.

In FIG. 1, the horizontal axis represents ΔAl and the vertical axis represents the Mo content (mass %) in the chemical composition of a coating substrate. In addition, "○" in FIG. 1 means that both (1) deformation due to the heat treatment and (2) oxidation resistance are evaluated as pass, and "×" means that at least one of (1) deformation due to the heat treatment or (2) oxidation resistance is evaluated as fail. The evaluation criteria are the same as in the EXAMPLES section below.

As illustrated in FIG. 1, it can be seen that if ΔAl is in the range of 2.5 to 7.0 and the Mo content in the chemical composition of the coating substrate is not less than (ΔAl/12+2.3), excellent oxidation resistance can be obtained while preventing deformation due to the heat treatment.

Further experiments by us revealed that if ΔAl is in the range of 2.5 to 7.0, excellent oxidation resistance can be obtained while preventing deformation due to the heat treatment by replacing a part or all of Mo with W, in other words, setting the total content of Mo and W to equal to or greater than (ΔAl/12+2.3).

Based on the above experimental results, we further studied and conceived an idea of satisfying the above formulas (1) and (2) at the same time, in other words, adjusting the Mo and W contents of the chemical composition of the coating substrate according to ΔAl.

For the above formula (2), it is more preferable to satisfy the following equation (2)'.

$$Mo+W-(\Delta Al/12+2.3) \geq 1.0 \quad (2)$$

The thickness t of the hot-dip Al or Al alloy coated layer is measured in the same manner as in the EXAMPLES section below.

The hot-dip Al or Al alloy coated layer of the Al or Al alloy-coated stainless steel sheet may be provided on only one side of the coating substrate, or on both sides. However, since if the hot-dip Al or Al alloy coated layer is provided on only one side of the coating substrate, the volume change during the diffusion heat treatment tends to be non-uniform in the thickness direction, the hot-dip Al or Al alloy coated layer is preferably provided on each of both sides of the coating substrate. When the hot-dip Al or Al alloy coated layer is provided on each of both sides of the coating substrate, the hot-dip Al or Al alloy coated layers preferably have about the same thickness (the difference in thickness between the coated layers is preferably set to 10 μm or less).

Next, a preferable manufacturing method for an Al or Al alloy-coated stainless steel sheet according to one of the disclosed embodiments will be described.

In detail, molten steel having the above chemical composition (chemical composition of the coating substrate of the Al or Al alloy-coated stainless steel sheet) is prepared by steelmaking through a commonly-known process such as using a converter, an electric furnace, or a vacuum melting furnace and is subjected to continuous casting or ingot casting and blooming to obtain a slab.

The slab is then rolled to obtain a ferritic stainless steel sheet to be used as a coating substrate.

The rolling method is not particularly limited and conventional methods can be used. For example, the slab is hot rolled to obtain a hot-rolled steel sheet and the hot-rolled steel sheet is subjected to cold rolling and cold-rolled sheet annealing, or the slab is hot rolled to obtain a hot-rolled steel sheet and the hot-rolled steel sheet is subjected to hot-rolled sheet annealing followed by cold rolling. The hot-rolled sheet annealing and cold-rolled sheet annealing are optional processes, and both may be performed, only one may be performed, or both may not be performed. The conditions of the hot rolling, hot-rolled sheet annealing, cold rolling and cold-rolled sheet annealing are not particularly limited and conventional methods can be used.

For example, the slab is heated at a temperature of 1100° C. or higher and 1250° C. or lower for 1 hour to 24 hours, and then hot rolled to obtain a hot-rolled steel sheet having a sheet thickness of approximately 2.0 mm to 6.0 mm. Subsequently, the hot-rolled steel sheet is subjected to descaling by pickling and mechanical polishing as required, followed by cold rolling and cold-rolled sheet annealing to obtain a ferritic stainless steel sheet to be used as a coating substrate.

Then, the ferritic stainless steel sheet to be used as a coating substrate is subjected to hot-dip Al or Al alloy coating to obtain an Al or Al alloy-coated stainless steel sheet. The coating is performed by any method and for example, a manufacturing method using a general continuous hot-dip coating line may be employed. In addition, the Sendzimir process, flux process, and pre-coating process are also applicable.

The temperature of the molten bath of the hot-dip Al or Al alloy coating (hereinafter referred to as bath temperature) is preferably set in the range of (the solidification start temperature+20° C.) to 750° C.

The reason why the preferable lower limit of the bath temperature is set to (solidification start temperature+20° C.) is to prevent local solidification of coating components caused by the local decrease in molten bath temperature. In addition, if the bath temperature exceeds 750° C., rapid cooling of the coating adhering to the surface of the coating substrate becomes difficult, which may lead to the occurrence of poor appearance called "sagging". Therefore, a preferable upper limit of the bath temperature is 750° C.

In addition, the immersion time in the molten bath is preferably 0.5 seconds or more from the viewpoint of forming a sufficient amount of coated layer on the surface of the coating substrate.

As the molten bath, the foregoing hot-dip Al coating or hot-dip Al—Si alloy coating may be used. The thickness of the hot-dip Al or Al alloy coated layer may be adjusted, for example, by $N_2$ gas wiping.

Furthermore, the conditions for pretreatment such as degreasing are not particularly limited and conventional methods can be used.

In addition, the temperature of the coating substrate (sheet temperature) when it enters the molten bath is not particularly limited, yet when the continuous hot-dip coating line is used, from the viewpoint of securing proper coating properties and preventing the bath temperature change during operation, the sheet temperature is preferably controlled within ±20° C. of the temperature of the molten bath.

In addition, although the heating conditions of the coating substrate before immersion into the molten bath is not particularly limited, in order to suppress the formation of a $Cr_2O_3$ layer during heating as best as possible, it is preferable to use a reducing gas atmosphere such as a mixture of $H_2$ and $N_2$ and set the dew point to −15° C. or lower.

Next, the method for manufacturing a ferritic stainless steel sheet according to one of the disclosed embodiments will be described.

In detail, the ferritic stainless steel sheet is manufactured by subjecting the Al or Al alloy-coated stainless steel sheet to heat treatment (diffusion heat treatment) in which the Al or Al alloy-coated stainless steel sheet is held in a temperature range of 600° C. to 1300° C. for at least one minute to thereby diffuse Al contained in the hot-dip Al or Al alloy coated layer into the coating substrate of the Al or Al alloy-coated stainless steel sheet and increase the Al content in the coating substrate to 2.5 mass % or more.

From the viewpoint of homogenizing Al to be diffused, the Al or Al alloy-coated stainless steel sheet is preferably held in a temperature range of 900° C. to 1200° C. for at least 10 minutes. Although no upper limit is placed on the holding time, the holding time is preferably set to 120 minutes or less from the viewpoint of productivity and the like.

The heat treatment may be performed in air, but in order to reduce the consumption of Al due to oxidation, it is preferable to perform the heat treatment in a non-oxidizing atmosphere such as in a vacuum of $1 \times 10^{-1}$ Pa or less, in an inert atmosphere such as Ar, in an $N_2$ atmosphere or in a mixed atmosphere of $H_2$ and $N_2$.

The heat treatment may be performed before the steel sheet is processed into a final part or after it is processed into a predetermined part shape. If brazing heat treatment is performed in the manufacturing process of a member such as metal honeycomb, or if the temperature at which the member is used exceeds 900° C., the heating process may be a substitute for the heat treatment (diffusion heat treatment).

Furthermore, prior to the heat treatment, the Al or Al alloy-coated stainless steel sheet may be additionally rolled (cold rolled) to reduce its thickness. In particular, when a ferritic stainless steel sheet with a thin thickness is manufactured, rolling to a final sheet thickness at a stage of coating substrate reduces the efficiency of the coating treatment. Further, the additional rolling process after the coating treatment alleviates the non-uniformity of Al coating weight on the surface of the coating substrate. Therefore, rather than rolling to a final sheet thickness at a stage of coating substrate, it is preferable to perform additional rolling after the coating treatment to achieve a desired final sheet thickness.

Even in the case where such additional rolling is performed, the amount of Al increased by diffusion heat treatment can be predicted by $30 \times t/T$, where T represents the thickness of the coating substrate before the rolling process and t represents the thickness of the Al or Al alloy coated layer before the rolling process.

The ferritic stainless steel sheet thus manufactured (hereinafter also referred to as ferritic stainless steel sheet as a finished product) can be suitably used for metal honeycombs. From the viewpoint of increasing the contact area with exhaust gas when the ferritic stainless steel sheet as a finished product is used as a metal honeycomb, the sheet thickness of the ferritic stainless steel sheet is preferably set to 200 μm or less. The sheet thickness is more preferably 150 μm or less, and further preferably 100 μm or less. The lower limit of the sheet thickness is preferably 20 μm or more in order to ensure strength, and more preferably 30 μm or more.

In the chemical composition of the ferritic stainless steel sheet as a finished product, the Al content is 2.5 mass % or more and 7.0 mass % or less. Further, then the hot-dip Al or Al alloy coated layer of the Al or Al alloy-coated stainless steel sheet is formed by hot-dip Al—Si alloy coating, the Si content also increases and the Si content may increase to about 2.0 mass % in the chemical composition of the ferritic stainless steel sheet of a finished product. The content of each of the elements other than Al and Si in the chemical composition of the ferritic stainless steel sheet of a finished product is basically the same as that in the chemical composition of the coating substrate of the Al or Al alloy-coated stainless steel sheet described above. However, the content of each of the elements other than Al and Si in the chemical composition of the ferritic stainless steel sheet of a finished product decreases relatively with the increase in Al content and Si content, specifically, it may decrease by about 10% from the content of each element in the chemical composition of the coating substrate.

Examples

Slabs having the chemical compositions listed in Tables 1 and 4 (with the balance being Fe and inevitable impurities) that were prepared by steelmaking in a 50 kg small vacuum melting furnace were heated to 1200° C. and then hot rolled in a temperature range of 900° C. to 1200° C. to obtain hot rolled steel sheets having a sheet thickness of 2.0 mm. Then, the obtained hot-rolled steel sheets were subjected to hot-rolled sheet annealing at 900° C. for 1 minute in air. Then, the surface scales of the hot-rolled steel sheets were removed by pickling treatment in which the hot-rolled steel sheets were immersed in a 20 mass % sulfuric acid solution at a temperature of 80° C. for 60 seconds and then immersed in a 15 mass % nitric acid-3 mass % hydrofluoric acid mixed solution at a temperature of 55° C. for 30 seconds. Then, the hot-rolled steel sheets were cold rolled to produce cold-rolled steel sheets (ferritic stainless steel sheets) with the sheet thicknesses T listed in Tables 2 and 5. The cold-rolled steel sheets other than Nos. 25 and 26 (steel sheets subjected to additional rolling after coating treatment as described below) were further subjected to cold-rolled sheet annealing in which the steel sheets were held at 900° C. for 20 seconds in a mixed atmosphere of $H_2$ and $N_2$ ($H_2:N_2=75:25$ by volume ratio).

Using each of the cold-rolled steel sheets thus obtained as a coating substrate, the coating treatment was performed by hot-dip coating to obtain an Al or Al alloy-coated stainless steel sheet.

Specifically, a steel sheet of 170 mm in length (in the rolling direction) and 70 mm in width (in the direction orthogonal to the rolling direction) cut out from the cold-rolled steel sheet was used as a coating substrate, and the coating substrate is heated and held in a mixed atmosphere of $H_2$ and $N_2$ ($H_2:N_2=90:10$ by volume ratio, dew point: −30° C.) at 700° C. for 20 seconds, and immediately after that, the coating substrate was subjected to hot-dip coating treatment in which the coating substrate was immersed in an Al molten bath at 700° C. or in an Al-8 mass % Si molten bath at 660° C. for 5 seconds to obtain an Al or Al alloy-coated stainless steel sheet.

The coating area in the coating substrate was an area with a length (in the rolling direction) of 100 mm and a width (in the direction orthogonal to the rolling direction) of 70 mm. The thickness of the hot-dip Al or Al alloy coated layer was adjusted by $N_2$ gas wiping.

The thickness of the hot-dip Al or Al alloy coated layer of the Al or Al alloy-coated stainless steel sheet thus obtained was measured as follows.

In detail, the coated area (with a length (in the rolling direction) of 100 mm and a width (in the direction orthogonal to the rolling direction) of 70 mm) of the Al or Al alloy-coated stainless steel sheet was cut out, and then an area of 10 mm was cut off from each edge to make a steel sheet with a length (in the rolling direction) of 80 mm and a width (in the direction orthogonal to the rolling direction) of 50 mm. Then, the areas of 10 mm from both ends in the rolling direction of the steel sheet were cut off, and the two cut-off steel sheets (with a length (in the rolling direction) of 10 mm and a width (in the direction orthogonal to the rolling direction) of 50 mm) were used as samples for measuring the thickness of the hot-dip Al or Al alloy coated layer. A ferritic stainless steel sheet as a finished product was manufactured from the remaining region (with a length (in the rolling direction) of 60 mm and a width (in the direction orthogonal to the rolling direction) of 50 mm) of the steel sheet.

From a center portion in the widthwise direction (direction orthogonal to the rolling direction) of each of the two samples for measuring the thickness of the hot-dip Al or Al alloy coated layer obtained as described above, a test piece for cross-sectional observation with a length (in the rolling direction) of 10 mm and a width (in the direction orthogonal to the rolling direction) of 7 mm was collected. The test piece for cross-sectional observation was collected so that the center position in the widthwise direction of the test piece for cross-sectional observation coincided with the center position in the widthwise direction of the corresponding sample for measuring the thickness of the hot-dip Al or Al alloy coated layer. Then, the collected test piece for cross-sectional observation was embedded in resin so as to expose a cross section in the rolling direction of the test piece for cross-sectional observation, and the cross-section in the rolling direction was mirror polished. Then, cross-sectional observation by scanning electron microscope (SEM) was performed with 1000 magnification to measure the thickness of the coated layer (the distance from the interface between the hot-dip Al or Al alloy coated layer and the coating substrate to the surface of the hot-dip Al or Al alloy coated layer) at intervals of 1 mm throughout the length in the rolling direction on each surface (on the front surface and on the rear surface) of the test piece for cross-sectional observation. Then, the arithmetic mean value of the thicknesses of the coated layer measured on each surface (on the front surface and on the rear surface) was calculated, and the sum of the calculated arithmetic mean values of the thicknesses of the coated layer of both surfaces (the arithmetic mean value of the thicknesses of the coated layer on the front surface and the arithmetic mean value of the thicknesses of the coated layer on the rear surface) was used as the total thickness of the hot-dip Al or Al alloy coated layers of the test piece for cross-sectional observation. The same measurement was carried out on the other test piece for cross-sectional observation, and the arithmetic mean value of the total thicknesses of the hot-dip Al or Al alloy coated layers calculated for the test pieces for cross-sectional observation was used as the thickness of the hot-dip Al or Al alloy coated layer of the Al or Al alloy-coated stainless steel sheet. The thickness of the hot-dip Al or Al alloy coated layer of the Al or Al alloy-coated stainless steel sheet is listed in Tables 2 and 5.

In addition, each of the Al or Al alloy-coated stainless steel sheets obtained as described above was subjected to heat treatment (diffusion heat treatment) to obtain a ferritic stainless steel sheet as a finished product (hereinafter, unless otherwise noted, the term "ferritic stainless steel sheet" means "ferritic stainless steel sheet as a finished product).

The heat treatment was performed by holding the Al or Al alloy-coated stainless steel sheet in a vacuum of $1 \times 10^{-1}$ Pa or less at 1100° C. for 30 minutes and subjecting it to furnace cooling.

Further, the Al or Al alloy-coated stainless steel sheets other than Nos. 25 and 26 were subjected to additional cold rolling before the heat treatment (diffusion heat treatment) to obtain the sheet thicknesses as listed in Tables 2 and 5 (when no additional rolling process was performed, the total thickness of an Al or Al alloy-coated stainless steel sheet (the thickness of the coating substrate+the thickness of the hot-dip Al or Al alloy coated layer) is listed in the "Sheet thickness of Al or Al alloy-coated stainless steel sheet after additional rolling process" column in Table 2).

The chemical composition of each of the ferritic stainless steel sheets thus obtained was measured by collecting chips from a portion of the ferritic stainless steel sheet and analyzing the chips through wet analysis. The measurement results are listed in Tables 3 and 6. The balance was Fe and inevitable impurities.

Using the obtained Al or Al alloy-coated stainless steel sheets and ferritic stainless steel sheets, (1) deformation due to heat treatment and (2) oxidation resistance were evaluated in the following manner. The evaluation results are listed in Tables 3 and 6.

(1) Deformation During Heat Treatment

Deformation during the heat treatment (deformation caused by warpage or distortion) was evaluated as follows.

In detail, three test pieces with a length (in the rolling direction) of 30 mm and a width (in the direction orthogonal to the rolling direction) of 10 mm were cut out from each of the Al or Al alloy-coated stainless steel sheets before heat treatment (in case where the additional rolling process is performed, the Al or Al alloy-coated stainless steel sheets after the additional rolling process). These test pieces were subjected to heat treatment simulating the diffusion heat treatment (heat treatment in which the test pieces were held in a vacuum of $1.0 \times 10^{-1}$ Pa or less at 1100° C. for 30 minutes, and then subjected to furnace cooling).

Then, the length at a center portion in the widthwise direction of each test piece after the heat treatment was measured and the amount of shape change was calculated by the following formula.

[Amount of shape change (%)]=([Length of test piece after heat treatment (mm)]−[Length of test piece before heat treatment (mm)])/[Length of test piece before heat treatment (mm)]×100

The length was measured using a caliper. If warpage was generated in the test piece, the length was measured while the test piece was pressed against a flat plate or the like to straighten it so that the warpage would not affect the measurement. Figures down to two decimal places are significant.

The (arithmetic) average value of the amounts of shape change of the three test pieces was calculated and the corresponding Al or Al alloy-coated stainless steel sheet was evaluated as excellent (pass) if the amount of shape change was ±2% or less, as good (pass) if the amount of shape change was more than ±2% and ±5% or less, and as poor (fail) if the amount of shape change was more than ±5%.

(2) Oxidation Resistance

The oxidation resistance was evaluated by an oxidation test in which a test piece was held in high-temperature air. In detail, two test pieces with a length (in the rolling direction) of 30 mm and a width (in the direction orthogonal to the rolling direction) of 20 mm were collected from each of the ferritic stainless steel sheets and oxidized at 1100° C. for 400 hours in an air atmosphere to measure the mass gain by oxidation before and after the oxidation treatment (amount of change in mass of each of the test pieces before and after the oxidation treatment divided by the surface area of the test piece before the oxidation treatment). The average value of the mass gains by oxidation of the test pieces was evaluated as the mass gain by oxidation of the ferritic stainless steel sheet by the following criteria.

Excellent (pass): the mass gain by oxidation is 8.0 g/m$^2$ or Less

Good (pass): the mass gain by oxidation is more than 8.0 g/m$^2$ and 12.0 g/m$^2$ or less.

Poor (fail): the mass gain by oxidation is more than 12.0 g/m$^2$ or coating exfoliation occurs.

TABLE 1

| Steel sample ID | Chemical composition of coating substrate (mass %) | | | | | | | | | | | | | | Remarks |
|---|---|---|---|---|---|---|---|---|---|---|---|---|---|---|---|
| | C | Si | Mn | P | S | Cr | Al | Ni | N | Mo | W | Zr | Hf | REM | |
| A | 0.005 | 0.16 | 0.10 | 0.024 | 0.002 | 20.9 | 0.03 | 0.14 | 0.005 | 5.1 | — | 0.06 | — | La: 0.11 | Conforming steel |
| B | 0.006 | 0.15 | 0.11 | 0.023 | 0.002 | 21.2 | 0.03 | 0.15 | 0.005 | 3.2 | — | 0.05 | — | La: 0.11 | Conforming steel |
| C | 0.005 | 0.14 | 0.11 | 0.024 | 0.002 | 21.1 | 0.04 | 0.16 | 0.005 | 2.7 | — | 0.05 | — | La: 0.14 | Conforming steel |
| D | 0.006 | 0.19 | 0.13 | 0.020 | 0.002 | 21.3 | 0.03 | 0.12 | 0.006 | _2.1_ | — | 0.05 | — | La: 0.12 | Comparative steel |

TABLE 2

| | | Al coated steel sheet | | | | | Sheet thickness of Al or Al alloy coated steel sheet after | |
|---|---|---|---|---|---|---|---|---|
| | | Coating substrate | | Thickness t of hot-dip | | | Additional | |
| No. | Composition of molten bath | Steel sample ID | Thickness T (μm) | Al coated layer (μm) | ΔAl | Mo + W − (ΔAl/12 + 2.3) | rolling process after coating treatment | additional rolling process (μm) | Remarks |
| 1 | Al—8% Si | A | 1000 | 43 | *1.3* | 2.7 | done | 50 | *Comparative example* |
| 2 | Al—8% Si | A | 1000 | 182 | 5.5 | 2.3 | done | 50 | Example |
| 3 | Al—8% Si | A | 300 | 84 | *8.4* | 2.1 | done | 50 | *Comparative example* |
| 4 | Al—8% Si | A | 300 | 68 | 6.8 | 2.2 | done | 50 | Example |
| 5 | Al—8% Si | A | 100 | 10 | 3.0 | 2.6 | done | 50 | Example |
| 6 | Al—8% Si | B | 1000 | 48 | *1.4* | 0.8 | done | 50 | *Comparative example* |
| 7 | Al—8% Si | B | 1000 | 187 | 5.6 | 0.4 | done | 50 | Example |
| 8 | Al—8% Si | B | 300 | 83 | *8.3* | 0.2 | done | 50 | *Comparative example* |
| 9 | Al—8% Si | B | 300 | 65 | 6.5 | 0.4 | done | 50 | Example |
| 10 | Al—8% Si | B | 100 | 10 | 3.0 | 0.7 | done | 50 | Example |
| 11 | Al—8% Si | C | 1000 | 45 | 1.4 | 0.3 | done | 50 | *Comparative example* |
| 12 | Al—8% Si | C | 1000 | 184 | 5.5 | *-0.1* | done | 50 | *Comparative example* |
| 13 | Al—8% Si | C | 300 | 86 | *8.6* | *-0.3* | done | 50 | *Comparative example* |
| 14 | Al—8% Si | C | 300 | 67 | 6.7 | *-0.2* | done | 50 | *Comparative example* |
| 15 | Al—8% Si | C | 100 | 10 | 3.0 | 0.2 | done | 50 | Example |
| 16 | Al—8% Si | *D* | 1000 | 48 | 1.4 | *-0.3* | done | 50 | *Comparative example* |
| 17 | Al—8% Si | D | 1000 | 185 | 5.6 | *-0.7* | done | 50 | *Comparative example* |
| 18 | Al—8% Si | D | 300 | 82 | *8.2* | *-0.9* | done | 50 | *Comparative example* |
| 19 | Al—8% Si | D | 300 | 63 | 6.3 | *-0.7* | done | 50 | *Comparative example* |
| 20 | Al—8% Si | D | 100 | 10 | 3.0 | *-0.5* | done | 50 | *Comparative example* |

TABLE 3

| | Chemical composition of ferritic stainless steel sheet as finished product (mass %) | | | | | | | | | | | | | | Evaluation results | | |
|---|---|---|---|---|---|---|---|---|---|---|---|---|---|---|---|---|---|
| | | | | | | | | | | | | | | | (1) Deformation during heat | (2) Oxidation | |
| No. | C | Si | Mn | P | S | Cr | Al | Ni | N | Mo | W | Zr | Hf | REM | treatment | resistance | Remarks |
| 1 | 0.004 | 0.81 | 0.08 | 0.022 | 0.001 | 20.2 | 1.5 | 0.12 | 0.004 | 4.9 | — | 0.03 | — | La: 0.08 | Excellent | Poor | *Comparative example* |
| 2 | 0.005 | 0.84 | 0.07 | 0.021 | 0.001 | 20.1 | 5.4 | 0.11 | 0.004 | 4.8 | — | 0.03 | — | La: 0.08 | Excellent | Good | Example |
| 3 | 0.003 | 0.93 | 0.07 | 0.021 | 0.001 | 19.8 | 8.6 | 0.11 | 0.003 | 4.7 | — | 0.02 | — | La: 0.07 | Poor | Good | *Comparative example* |
| 4 | 0.003 | 0.95 | 0.07 | 0.022 | 0.001 | 20.0 | 6.5 | 0.12 | 0.003 | 4.8 | — | 0.03 | — | La: 0.08 | Excellent | Good | Example |
| 5 | 0.003 | 0.79 | 0.08 | 0.022 | 0.001 | 20.1 | 2.8 | 0.12 | 0.004 | 4.9 | — | 0.03 | — | La: 0.08 | Excellent | Good | Example |
| 6 | 0.005 | 0.79 | 0.09 | 0.021 | 0.001 | 19.9 | 1.2 | 0.13 | 0.004 | 2.6 | — | 0.04 | — | La: 0.07 | Excellent | Poor | *Comparative example* |
| 7 | 0.005 | 0.85 | 0.09 | 0.019 | 0.001 | 19.5 | 5.8 | 0.12 | 0.003 | 2.3 | — | 0.03 | — | La: 0.07 | Good | Good | Example |
| 8 | 0.004 | 0.91 | 0.08 | 0.019 | 0.001 | 19.5 | 8.1 | 0.11 | 0.003 | 2.1 | — | 0.03 | — | La: 0.06 | Poor | Good | *Comparative example* |
| 9 | 0.004 | 0.84 | 0.08 | 0.021 | 0.001 | 19.8 | 6.1 | 0.12 | 0.002 | 2.5 | — | 0.02 | — | La: 0.08 | Good | Good | Example |
| 10 | 0.004 | 0.81 | 0.09 | 0.021 | 0.001 | 19.8 | 2.6 | 0.12 | 0.003 | 2.6 | — | 0.02 | — | La: 0.08 | Excellent | Good | Example |
| 11 | 0.003 | 0.78 | 0.09 | 0.021 | 0.001 | 19.8 | 1.1 | 0.14 | 0.003 | 2.2 | — | 0.04 | — | La: 0.10 | Excellent | Poor | *Comparative example* |
| 12 | 0.004 | 0.76 | 0.08 | 0.021 | 0.001 | 19.6 | 5.4 | 0.14 | 0.003 | 2.1 | — | 0.04 | — | La: 0.09 | Poor | Good | *Comparative example* |
| 13 | 0.003 | 0.89 | 0.08 | 0.020 | 0.001 | 19.6 | 8.1 | 0.12 | 0.002 | 1.9 | — | 0.03 | — | La: 0.09 | Poor | Good | *Comparative example* |
| 14 | 0.003 | 0.75 | 0.08 | 0.022 | 0.001 | 19.6 | 6.8 | 0.12 | 0.003 | 2.1 | — | 0.03 | — | La: 0.10 | Poor | Good | *Comparative example* |
| 15 | 0.004 | 0.76 | 0.08 | 0.022 | 0.001 | 19.8 | 2.9 | 0.13 | 0.003 | 2.2 | — | 0.04 | — | La: 0.11 | Excellent | Good | Example |
| 16 | 0.005 | 0.78 | 0.11 | 0.018 | 0.001 | 19.8 | 1.1 | 0.10 | 0.004 | 1.8 | — | 0.04 | — | La: 0.09 | Poor | Poor | *Comparative example* |
| 17 | 0.004 | 0.91 | 0.11 | 0.018 | 0.001 | 19.6 | 5.9 | 0.09 | 0.004 | 1.6 | — | 0.03 | — | La: 0.08 | Poor | Good | *Comparative example* |
| 18 | 0.004 | 0.95 | 0.09 | 0.017 | 0.001 | 19.6 | 8.4 | 0.08 | 0.003 | 1.5 | — | 0.03 | — | La: 0.07 | Poor | Good | *Comparative example* |
| 19 | 0.004 | 0.85 | 0.09 | 0.018 | 0.001 | 19.8 | 6.2 | 0.08 | 0.004 | 1.6 | — | 0.03 | — | La: 0.06 | Poor | Good | *Comparative example* |
| 20 | 0.005 | 0.81 | 0.11 | 0.019 | 0.001 | 19.8 | 3.2 | 0.09 | 0.004 | 1.7 | — | 0.03 | — | La: 0.06 | Poor | Good | *Comparative example* |

TABLE 4

| Steel sample ID | Chemical composition of coating substrate (mass %) | | | | | | | | | | | | | | | Remarks |
|---|---|---|---|---|---|---|---|---|---|---|---|---|---|---|---|---|
| | C | Si | Mn | P | S | Cr | Al | Ni | N | Mo | W | Zr | Hf | REM | Others | |
| E1 | 0.005 | 0.15 | 0.15 | 0.033 | 0.001 | 21.3 | 0.03 | 0.15 | 0.006 | 2.7 | — | 0.03 | — | La: 0.11 | — | Conforming steel |
| E2 | 0.004 | 0.16 | 0.13 | 0.031 | 0.001 | 21.1 | 0.03 | 0.16 | 0.005 | 4.1 | — | 0.05 | — | La: 0.05 | — | Conforming steel |
| E3 | 0.005 | 0.15 | 0.16 | 0.031 | 0.002 | 21.5 | 0.04 | 0.16 | 0.005 | 4.3 | — | — | 0.04 | La: 0.0.5 | — | Conforming steel |
| E4 | 0.005 | 0.16 | 0.16 | 0.029 | 0.002 | 21.1 | 0.03 | 0.15 | 0.004 | 4.2 | — | 0.12 | — | — | — | Conforming steel |
| E5 | 0.006 | 0.14 | 0.14 | 0.022 | 0.001 | 21.2 | 0.03 | 0.14 | 0.006 | 4.2 | — | 0.09 | — | — | — | Conforming steel |
| E6 | 0.005 | 0.15 | 0.15 | 0.028 | 0.001 | 21.1 | 0.04 | 0.14 | 0.005 | 4.3 | — | — | — | La: 0.10 | — | Conforming steel |
| F | 0.014 | 0.15 | 0.45 | 0.031 | 0.001 | 11.5 | 0.84 | 0.29 | 0.014 | 5.8 | — | 0.08 | — | La: 0.08 | Cu: 0.04 | Conforming steel |
| G | 0.015 | 0.32 | 0.16 | 0.023 | 0.002 | 18.1 | 0.01 | 0.15 | 0.014 | 3.2 | — | 0.04 | — | La: 0.11 | Ti: 0.25 | Conforming steel |
| H | 0.024 | 0.14 | 0.11 | 0.024 | 0.002 | 28.9 | 0.32 | 0.16 | 0.017 | 2.7 | — | 0.03 | — | La: 0.18 | Nb: 0.31 | Conforming steel |
| I | 0.005 | 0.16 | 0.14 | 0.033 | 0.004 | 21.2 | 0.03 | 0.15 | 0.005 | — | 2.6 | 0.04 | — | La: 0.12 | — | Conforming steel |
| J | 0.006 | 0.19 | 0.13 | 0.024 | 0.002 | 21.4 | 0.04 | 0.14 | 0.006 | 2.8 | 2.9 | 0.03 | — | La: 0.13 | — | Conforming steel |
| K | 0.008 | 0.15 | 0.14 | 0.023 | 0.003 | 21.1 | 0.03 | 0.15 | 0.011 | 2.9 | — | 0.08 | — | — | — | Conforming steel |
| L | 0.006 | 0.16 | 0.15 | 0.031 | 0.003 | 20.9 | 0.04 | 0.18 | 0.008 | 3.1 | — | — | 0.05 | — | — | Conforming steel |
| M | 0.005 | 0.15 | 0.14 | 0.033 | 0.003 | 20.8 | 0.03 | 0.17 | 0.009 | 3.0 | — | — | — | La: 0.16 | — | Conforming steel |
| N | 0.005 | 0.17 | 0.15 | 0.035 | 0.002 | 20.9 | 0.05 | 0.15 | 0.006 | 3.0 | — | — | 0.08 | Ce: 0.05, La: 0.03, Nd: 0.02 | — | Conforming steel |
| O | 0.006 | 0.17 | 0.16 | 0.022 | 0.004 | 21.2 | 0.04 | 0.16 | 0.006 | — | 3.1 | 0.03 | — | La: 0.18 | V: 0.12, B: 0.0005 | Conforming steel |
| P | 0.005 | 0.15 | 0.15 | 0.026 | 0.003 | 21.3 | 0.03 | 0.15 | 0.007 | 2.9 | — | 0.04 | — | La: 0.19 | Ca: 0.0012, Mg: 0.0028 | Conforming steel |
| Q | 0.008 | 0.16 | 0.15 | 0.031 | 0.003 | 20.8 | 0.02 | 0.17 | 0.005 | *1.2* | — | 0.03 | — | La: 0.11 | — | *Comparative steel* |
| R | 0.008 | 0.16 | 0.14 | 0.029 | 0.001 | 20.8 | 0.01 | 0.11 | 0.006 | — | *0.9* | 0.04 | — | La: 0.08 | — | *Comparative steel* |
| S | 0.007 | 0.15 | 0.15 | 0.028 | 0.001 | 20.9 | 0.02 | 0.14 | 0.006 | 3.2 | — | — | — | — | — | *Comparative steel* |
| T | 0.006 | 0.15 | 0.15 | 0.031 | 0.001 | 20.1 | 0.03 | 0.14 | 0.006 | 3.1 | — | 0.03 | — | La: 0.11 | Co: 0.14 | Conforming steel |
| U | 0.005 | 0.14 | 0.15 | 0.033 | 0.001 | 20.2 | 0.03 | 0.15 | 0.005 | 3.0 | — | 0.02 | 0.02 | — | — | Conforming steel |
| V | 0.005 | 0.15 | 0.14 | 0.033 | 0.002 | 20.3 | 0.03 | 0.15 | 0.007 | 2.8 | — | 0.04 | — | Y: 0.12 | — | Conforming steel |
| W | 0.006 | 0.15 | 0.15 | 0.029 | 0.001 | 20.5 | 0.04 | 0.15 | 0.005 | — | 5.7 | 0.03 | — | La: 0.08 | — | Conforming steel |
| X | 0.005 | 0.15 | 0.15 | 0.031 | 0.002 | 20.1 | 0.03 | 0.14 | 0.006 | — | 2.6 | 0.03 | — | La: 0.08 | — | Conforming steel |

TABLE 5

| No. | Composition of molten bath | Al coated steel sheet | | | | Additional rolling process after coating treatment | Sheet thickness of Al or Al alloy coated steel sheet after additional rolling process (μm) | Remarks |
|---|---|---|---|---|---|---|---|---|
| | | Coating substrate | | Thickness t of hot-dip Al coated layer (μm) | ΔAl | Mo + W − (ΔAl/12 + 2.3) | | | |
| | | Steel sample ID | Thickness T (μm) | | | | | | |
| 21 | Al | E1 | 300 | 18 | *1.8* | 0.3 | done | 50 | *Comparative example* |
| 22 | Al | E1 | 300 | 35 | 3.5 | 0.1 | done | 50 | Example |
| 23 | Al | E1 | 300 | 67 | 6.7 | *−0.2* | done | 50 | *Comparative example* |
| 24 | Al | E1 | 300 | 88 | *8.8* | *−0.3* | done | 50 | *Comparative example* |
| 25 | Al—8% Si | E1 | 80 | 10 | 3.8 | 0.1 | undone | 90 | Example |
| 26 | Al—8% Si | E1 | 80 | 9 | 3.4 | 0.1 | undone | 89 | Example |
| 27 | Al—8% Si | E2 | 300 | 52 | 5.2 | 1.4 | done | 50 | Example |
| 28 | Al—8% Si | E3 | 300 | 55 | 5.5 | 1.5 | done | 50 | Example |
| 29 | Al—8% Si | E4 | 300 | 49 | 4.9 | 1.5 | done | 50 | Example |
| 30 | Al—8% Si | E5 | 300 | 58 | 5.8 | 1.4 | done | 50 | Example |
| 31 | Al—8% Si | E6 | 300 | 51 | 5.1 | 1.6 | done | 50 | Example |
| 32 | Al—8% Si | F | 300 | 58 | 5.8 | 3.0 | done | 50 | Example |
| 33 | Al—8% Si | G | 300 | 62 | 6.2 | 0.4 | done | 50 | Example |
| 34 | Al—8% Si | H | 300 | 29 | 2.9 | 0.2 | done | 50 | Example |
| 35 | Al—8% Si | I | 300 | 28 | 2.8 | 0.1 | done | 50 | Example |
| 36 | Al—8% Si | J | 300 | 41 | 4.1 | 3.1 | done | 50 | Example |
| 37 | Al—8% Si | K | 300 | 51 | 5.1 | 0.2 | done | 50 | Example |
| 38 | Al—8% Si | L | 300 | 44 | 4.4 | 0.4 | done | 50 | Example |
| 39 | Al—8% Si | M | 300 | 42 | 4.2 | 0.4 | done | 50 | Example |
| 40 | Al—8% Si | N | 300 | 43 | 4.3 | 0.3 | done | 50 | Example |
| 41 | Al—8% Si | O | 300 | 51 | 5.1 | 0.4 | done | 50 | Example |
| 42 | Al—8% Si | P | 300 | 53 | 5.3 | 0.2 | done | 50 | Example |
| 43 | Al—8% Si | *Q* | 300 | 58 | 5.8 | *−1.6* | done | 50 | *Comparative example* |
| 44 | Al—8% Si | *R* | 300 | 61 | 6.1 | *−1.9* | done | 50 | *Comparative example* |
| 45 | Al—8% Si | *S* | 300 | 59 | 5.9 | 0.4 | done | 50 | *Comparative example* |
| 46 | Al—8% Si | T | 300 | 53 | 5.3 | 0.4 | done | 50 | Example |

TABLE 5-continued

|  | Al coated steel sheet | | | | | | Sheet thickness of Al or Al alloy coated steel sheet after additional rolling process (μm) | |
|---|---|---|---|---|---|---|---|---|
|  | Coating substrate | | Thickness t of hot-dip | | |  Additional | | |
| No. | Composition of molten bath | Steel sample ID | Al coated layer (μm) | ΔAl | Mo + W − (ΔAl/12 + 2.3) | rolling process after coating treatment |  | Remarks |
| 47 | Al—8% Si | U | 300 | 58 | 5.8 | 0.2 | done | 50 | Example |
| 48 | Al—8% Si | V | 300 | 42 | 4.2 | 0.2 | done | 50 | Example |
| 49 | Al—8% Si | W | 300 | 55 | 5.5 | 2.9 | done | 50 | Example |
| 50 | Al—8% Si | X | 300 | 26 | 2.6 | 0.1 | done | 50 | Example |
| 51 | Al—8% Si | X | 300 | 91 | *9.1* | *−0.5* | done | 50 | *Comparative example* |
| 52 | Al—8% Si | X | 300 | 12 | *1.2* | 0.2 | done | 50 | *Comparative example* |
| 53 | Al—8% Si | X | 300 | 61 | 6.1 | *−0.2* | done | 50 | *Comparative example* |

TABLE 6

Chemical composition of ferritic stainless steel sheet as finished product (mass %)

| No. | C | Si | Mn | P | S | Cr | Al | Ni | N |
|---|---|---|---|---|---|---|---|---|---|
| 21 | 0.004 | 0.13 | 0.13 | 0.013 | 0.001 | 20.1 | 1.9 | 0.13 | 0.004 |
| 22 | 0.004 | 0.13 | 0.14 | 0.029 | 0.001 | 20.0 | 3.6 | 0.13 | 0.004 |
| 23 | 0.004 | 0.13 | 0.13 | 0.029 | 0.001 | 20.1 | 6.8 | 0.13 | 0.004 |
| 24 | 0.003 | 0.11 | 0.12 | 0.025 | 0.001 | 18.8 | 9.1 | 0.11 | 0.003 |
| 25 | 0.003 | 0.94 | 0.14 | 0.029 | 0.001 | 19.2 | 3.7 | 0.13 | 0.004 |
| 26 | 0.003 | 0.91 | 0.13 | 0.031 | 0.001 | 20.0 | 3.2 | 0.14 | 0.004 |
| 27 | 0.003 | 0.89 | 0.12 | 0.029 | 0.001 | 20.1 | 5.6 | 0.14 | 0.004 |
| 28 | 0.004 | 0.91 | 0.14 | 0.021 | 0.001 | 20.5 | 5.1 | 0.13 | 0.003 |
| 29 | 0.003 | 0.85 | 0.13 | 0.025 | 0.001 | 19.8 | 5.3 | 0.12 | 0.004 |
| 30 | 0.004 | 0.88 | 0.11 | 0.019 | 0.001 | 19.5 | 5.4 | 0.11 | 0.004 |
| 31 | 0.003 | 0.82 | 0.14 | 0.021 | 0.001 | 20.2 | 5.3 | 0.12 | 0.003 |
| 32 | 0.010 | 1.10 | 0.42 | 0.029 | 0.001 | 11.0 | 6.5 | 0.27 | 0.010 |
| 33 | 0.010 | 1.30 | 0.14 | 0.021 | 0.002 | 16.8 | 6.3 | 0.13 | 0.010 |
| 34 | 0.017 | 0.91 | 0.10 | 0.022 | 0.002 | 27.1 | 2.8 | 0.14 | 0.012 |
| 35 | 0.004 | 0.89 | 0.13 | 0.030 | 0.004 | 20.5 | 5.1 | 0.13 | 0.003 |
| 36 | 0.004 | 0.92 | 0.11 | 0.021 | 0.002 | 20.2 | 4.0 | 0.13 | 0.004 |
| 37 | 0.005 | 0.95 | 0.13 | 0.022 | 0.003 | 19.4 | 4.9 | 0.13 | 0.008 |
| 38 | 0.004 | 0.84 | 0.14 | 0.029 | 0.003 | 19.9 | 4.1 | 0.16 | 0.005 |
| 39 | 0.003 | 0.81 | 0.13 | 0.031 | 0.003 | 19.1 | 3.8 | 0.14 | 0.006 |
| 40 | 0.004 | 1.10 | 0.13 | 0.032 | 0.002 | 19.1 | 4.4 | 0.14 | 0.004 |
| 41 | 0.004 | 0.98 | 0.15 | 0.019 | 0.004 | 20.6 | 4.8 | 0.14 | 0.004 |
| 42 | 0.004 | 0.91 | 0.14 | 0.025 | 0.003 | 19.8 | 5.4 | 0.13 | 0.005 |
| 43 | 0.005 | 1.10 | 0.14 | 0.028 | 0.003 | 20.2 | 6.0 | 0.16 | 0.003 |
| 44 | 0.006 | 1.10 | 0.13 | 0.025 | 0.001 | 18.8 | 6.5 | 0.10 | 0.004 |
| 45 | 0.005 | 0.90 | 0.13 | 0.024 | 0.001 | 18.9 | 6.1 | 0.13 | 0.004 |
| 46 | 0.005 | 0.91 | 0.13 | 0.023 | 0.001 | 19.3 | 5.8 | 0.13 | 0.005 |
| 47 | 0.003 | 0.84 | 0.14 | 0.029 | 0.001 | 19.2 | 6.1 | 0.12 | 0.003 |
| 48 | 0.003 | 0.88 | 0.12 | 0.031 | 0.001 | 19.0 | 3.9 | 0.13 | 0.005 |
| 49 | 0.004 | 0.92 | 0.13 | 0.025 | 0.001 | 18.9 | 5.6 | 0.12 | 0.004 |
| 50 | 0.004 | 0.68 | 0.14 | 0.029 | 0.001 | 19.1 | 2.8 | 0.13 | 0.004 |
| 51 | 0.004 | 1.21 | 0.14 | 0.026 | 0.001 | 18.2 | 8.8 | 0.11 | 0.003 |
| 52 | 0.005 | 0.36 | 0.14 | 0.030 | 0.001 | 19.6 | 0.9 | 0.13 | 0.005 |
| 53 | 0.004 | 0.93 | 0.15 | 0.024 | 0.001 | 18.3 | 5.8 | 0.10 | 0.004 |

| | Chemical composition of ferritic stainless steel sheet as finished product (mass %) | | | | | | Evaluation results | | |
|---|---|---|---|---|---|---|---|---|---|
| | | | | | | | (1) Deformation during heat treatment | (2) Oxidation resistance | |
| No. | Mo | W | Zr | Hf | REM | Others | | | Remarks |
| 21 | 2.3 | — | 0.02 | — | La: 0.09 | — | Excellent | Poor | *Comparative example* |
| 22 | 2.4 | — | 0.03 | — | La: 0.09 | — | Excellent | Good | Example |
| 23 | 2.4 | — | 0.02 | — | La: 0.10 | — | Poor | Good | *Comparative example* |
| 24 | 2.0 | — | 0.02 | — | La: 0.08 | — | Poor | Good | *Comparative example* |
| 25 | 2.5 | — | 0.03 | — | La: 0.09 | — | Excellent | Good | Example |
| 26 | 2.3 | — | 0.02 | — | La: 0.10 | — | Excellent | Good | Example |
| 27 | 3.6 | — | 0.03 | — | La: 0.05 | — | Excellent | Good | Example |
| 28 | 3.5 | — | — | 0.03 | La: 0.0.5 | — | Excellent | Good | Example |
| 29 | 3.8 | — | 0.08 | — | — | — | Good | Good | Example |
| 30 | 3.9 | — | 0.06 | — | — | — | Good | Good | Example |

TABLE 6-continued

| No. | | | | | REM | Others | | | |
|---|---|---|---|---|---|---|---|---|---|
| 31 | 3.9 | — | — | — | La: 0.10 | — | Good | Good | Example |
| 32 | 5.2 | — | 0.07 | — | La: 0.07 | Cu: 0.03 | Excellent | Good | Example |
| 33 | 3.0 | — | 0.03 | — | La: 0.09 | Ti: 0.21 | Good | Good | Example |
| 34 | 2.5 | — | 0.02 | — | La: 0.17 | Nb: 0.27 | Excellent | Good | Example |
| 35 | — | 2.4 | 0.03 | — | La: 0.09 | — | Excellent | Good | Example |
| 36 | 2.6 | 2.6 | 0.02 | — | La: 0.08 | — | Excellent | Good | Example |
| 37 | 2.5 | — | 0.06 | — | — | — | Good | Good | Example |
| 38 | 2.7 | — | — | 0.05 | — | — | Good | Good | Example |
| 39 | 2.7 | — | — | — | La: 0.14 | — | Good | Good | Example |
| 40 | 2.7 | — | — | 0.07 | Ce: 0.04, La: 0.02, Nd: 0.02 | — | Good | Good | Example |
| 41 | — | 2.8 | 0.02 | — | La: 0.15 | V: 0.10, B: 0.0004 | Good | Good | Example |
| 42 | 2.6 | — | 0.03 | — | La: 0.16 | Ca: 0.0010, Mg: 0.0022 | Good | Good | Example |
| 43 | 1.1 | — | 0.02 | — | La: 0.09 | — | Poor | Good | *Comparative example* |
| 44 | — | 0.8 | 0.03 | — | La: 0.07 | — | Poor | Good | *Comparative example* |
| 45 | 3.0 | — | — | — | — | — | Poor | Poor | *Comparative example* |
| 46 | 2.9 | — | 0.02 | — | La: 0.09 | Co: 0.11 | Good | Good | Example |
| 47 | 2.6 | — | 0.02 | 0.01 | — | — | Good | Good | Example |
| 48 | 2.5 | — | 0.03 | — | Y: 0.10 | — | Good | Good | Example |
| 49 | — | 5.1 | 0.02 | — | La: 0.06 | — | Excellent | Good | Example |
| 50 | — | 2.4 | 0.02 | — | La: 0.06 | — | Excellent | Good | Example |
| 51 | — | 2.1 | 0.01 | — | La: 0.05 | — | Poor | Good | *Comparative example* |
| 52 | — | 2.3 | 0.03 | — | La: 0.07 | — | Excellent | Poor | *Comparative example* |
| 53 | — | 2.2 | 0.02 | — | La: 0.06 | — | Poor | Good | *Comparative example* |

According to Tables 3 and 6, it can be seen that our examples had less deformation during the heat treatment and also had excellent oxidation resistance.

On the other hand, Comparative Examples of Nos. 1, 6, 11, 16, 21 and 52 could not obtain sufficient oxidation resistance because ΔAl was less than 2.5 and thus the Al content of the ferritic stainless steel sheet as a finished product could not be sufficiently increased. Further, in No. 16, deformation during the heat treatment was not sufficiently suppressed since the formula (2) was not satisfied.

In Comparative Examples of Nos. 3 and 8, deformation during the heat treatment could not be sufficiently suppressed because ΔAl was more than 7.0.

In Comparative Examples of Nos. 12, 14, 17, 19, 20, 23, 43, 44 and 53, deformation during the heat treatment could not be sufficiently suppressed since the formula (2) was not satisfied.

In Comparative Examples of Nos. 13, 18, 24 and 51, deformation during the heat treatment could not be sufficiently suppressed since ΔAl was more than 7.0 and the formula (2) was not satisfied.

In Comparative Example of No. 45, deformation during the heat treatment could not be sufficiently suppressed because the chemical composition of the coating substrate thereof neither contains Zr, Hf, nor REM. In addition, sufficient oxidation resistance could not be obtained.

The invention claimed is:

1. An Al or Al alloy-coated stainless steel sheet comprising a coating substrate and a hot-dip Al or Al alloy coated layer on a surface of the coating substrate,
    wherein the coating substrate is a ferritic stainless steel sheet having a chemical composition consisting of, in mass %,
    C: 0.030% or less,
    Si: 1.50% or less,
    Mn: 1.00% or less,
    P: 0.040% or less,
    S: 0.010% or less,
    Cr: 11.0% or more and 30.0% or less,
    Al: 1.00% or less,
    Ni: 0.05% or more and 0.50% or less,
    N: 0.030% or less,
    at least one selected from the group consisting of
        Mo: 2.5% or more and 6.0% or less and
        W: 2.5% or more and 6.0% or less,
    and at least one selected from the group consisting of
        Zr: 0.01% or more and 0.20% or less,
        Hf: 0.01% or more and 0.20% or less and
        REM: 0.01% or more and 0.20% or less,
    with the balance being Fe and inevitable impurities, and
    Mo and W contents in the chemical composition of the coating substrate and ΔAl satisfy the following formulas (1) and (2):

$$2.5 \leq \Delta Al \leq 7.0 \quad (1)$$

$$Mo + W - (\Delta Al/12 + 2.3) \geq 0 \quad (2)$$

where $$\Delta Al = 30 \times t/T \quad (3)$$

and in the above formulas (1) to (3),
    Mo is the Mo content in the chemical composition of the coating substrate (mass %),
    W is the W content in the chemical composition of the coating substrate (mass %),
    T is the thickness of the coating substrate (μm), and
    t is the thickness of the hot-dip Al or Al alloy coated layer, and, in the case where the hot-dip Al or Al alloy coated layer is present on each of both sides of the coating substrate, is the total thickness of the hot-dip Al or Al alloy coated layers on both sides of the coating substrate (μm).

2. A method for manufacturing a ferritic stainless steel sheet, comprising subjecting the Al or Al alloy-coated stainless steel sheet according to claim 1 to heat treatment in which the Al or Al alloy-coated stainless steel sheet is held at a temperature range of 600° C. to 1300° C. for at least one minute.

3. A method for manufacturing a ferritic stainless steel sheet, comprising subjecting the Al or Al alloy-coated stainless steel sheet according to claim 1 to cold rolling followed by heat treatment in which the Al or Al alloy-coated stainless steel sheet is held at a temperature range of 600° C. to 1300° C. for at least one minute.

4. An Al or Al alloy-coated stainless steel sheet comprising a coating substrate and a hot-dip Al or Al alloy coated layer on a surface of the coating substrate,
wherein the coating substrate is a ferritic stainless steel sheet having a chemical composition consisting of, in mass %,
C: 0.030% or less,
Si: 1.50% or less,
Mn: 1.00% or less,
P: 0.040% or less,
S: 0.010% or less,
Cr: 11.0% or more and 30.0% or less,
Al: 1.00% or less,
Ni: 0.05% or more and 0.50% or less,
N: 0.030% or less,
at least one selected from the group consisting of
Mo: 2.5% or more and 6.0% or less and
W: 2.5% or more and 6.0% or less,
and at least one selected from the group consisting of
Zr: 0.01% or more and 0.20% or less,
Hf: 0.01% or more and 0.20% or less and
REM: 0.01% or more and 0.20% or less, and
at least one selected from the group consisting of
Cu: 0.01% or more and 0.10% or less,
Ti: 0.01% or more and 0.50% or less,
Nb: 0.01% or more and 0.50% or less,
V: 0.01% or more and 0.50% or less,
B: 0.0001% or more and 0.0050% or less,
Ca: 0.0002% or more and 0.0100% or less, and
Co: 0.01% or more and 0.50% or less,
with the balance being Fe and inevitable impurities, and
Mo and W contents in the chemical composition of the coating substrate and $\Delta Al$ satisfy the following formulas (1) and (2):

$$2.5 \leq \Delta Al \leq 7.0 \quad (1)$$

$$Mo+W-(\Delta Al/12+2.3) \geq 0 \quad (2)$$

where $$\Delta Al = 30 \times t/T \quad (3)$$

and in the above formulas (1) to (3),
Mo is the Mo content in the chemical composition of the coating substrate (mass %),
W is the W content in the chemical composition of the coating substrate (mass %),
T is the thickness of the coating substrate (μm), and
t is the thickness of the hot-dip Al or Al alloy coated layer, and, in the case where the hot-dip Al or Al alloy coated layer is present on each of both sides of the coating substrate, is the total thickness of the hot-dip Al or Al alloy coated layers on both sides of the coating substrate (μm).

5. A method for manufacturing a ferritic stainless steel sheet, comprising subjecting the Al or Al alloy-coated stainless steel sheet according to claim 4 to heat treatment in which the Al or Al alloy-coated stainless steel sheet is held at a temperature range of 600° C. to 1300° C. for at least one minute.

6. A method for manufacturing a ferritic stainless steel sheet, comprising subjecting the Al or Al alloy-coated stainless steel sheet according to claim 4 to cold rolling followed by heat treatment in which the Al or Al alloy-coated stainless steel sheet is held at a temperature range of 600° C. to 1300° C. for at least one minute.

* * * * *